US012282695B2

(12) United States Patent
Enriquez Ortiz et al.

(10) Patent No.: US 12,282,695 B2
(45) Date of Patent: Apr. 22, 2025

(54) DISPLAY DEVICE BEHIND VENEER PANEL AND METHODS FOR OPERATING SAME

(71) Applicant: JoysonQuin Automotive Systems North America, LLC, Troy, MI (US)

(72) Inventors: Mario J. Enriquez Ortiz, Holland, MI (US); Frances A. Elenbaas, Grand Rapids, MI (US)

(73) Assignee: JOYSONQUIN AUTOMOTIVE SYSTEMS NORTH AMERICA, LLC, Troy, MI (US)

(*) Notice: Subject to any disclaimer, the term of this patent is extended or adjusted under 35 U.S.C. 154(b) by 0 days.

(21) Appl. No.: 18/613,957

(22) Filed: Mar. 22, 2024

(65) Prior Publication Data

US 2024/0345788 A1 Oct. 17, 2024

Related U.S. Application Data

(60) Provisional application No. 63/495,570, filed on Apr. 12, 2023.

(51) Int. Cl.
| | |
|---|---|
| *G06F 3/14* | (2006.01) |
| *G06T 7/13* | (2017.01) |
| *G06T 7/90* | (2017.01) |
| *G06V 10/24* | (2022.01) |
| *G06V 10/44* | (2022.01) |
| *G06V 10/762* | (2022.01) |

(Continued)

(52) U.S. Cl.
CPC .......... *G06F 3/14* (2013.01); *G06T 7/13* (2017.01); *G06T 7/90* (2017.01); *G06V 10/245* (2022.01); *G06V 10/44* (2022.01); *G06V 10/762* (2022.01); *G06V 10/764* (2022.01); *G09G 5/10* (2013.01)

(58) Field of Classification Search
CPC .... G06F 3/14; G06T 7/13; G06T 7/90; G06V 10/762; G06V 10/44; G06V 10/764; G06V 10/245; G09G 5/10
See application file for complete search history.

(56) References Cited

U.S. PATENT DOCUMENTS

2012/0139956 A1* 6/2012 Joseph ................. G09G 3/3406
345/55

FOREIGN PATENT DOCUMENTS

EP 3440662 B1 10/2022

OTHER PUBLICATIONS

Extended European Search Report issued for corresponding European Patent Application No. 24167253.4 dated May 8, 2024, 12 pages.

* cited by examiner

*Primary Examiner* — Benjamin C Lee
*Assistant Examiner* — Nathan P Brittingham
(74) *Attorney, Agent, or Firm* — Duane Morris LLP

(57) ABSTRACT

A visual display covered by a veneer displays information in a manner that the information is not obscured by a pattern that appears in the veneer. To do this, a processor receives a pixel map of the pattern. When the processor receives a command to display an image, the processor will process the image to align: (a) a first set of features of the image to regions of a display device that correspond to first class areas in the pixel map; and (b) a second set of features of the image to regions of the display device that correspond to the second areas in the pixel map. The processor will then cause the display device to display the processed image while the veneer that exhibits the pattern is positioned over the display device.

20 Claims, 7 Drawing Sheets

(51) Int. Cl.
*G06V 10/764* (2022.01)
*G09G 5/10* (2006.01)

301

| 1 | 1 | 0 | 0 | 1 | 0 |
|---|---|---|---|---|---|
| 1 | 0 | 1 | 0 | 1 | 0 |
| 1 | 0 | 1 | 0 | 0 | 1 |
| 0 | 1 | 0 | 1 | 0 | 1 |
| 0 | 1 | 0 | 1 | 0 | 1 |
| 0 | 1 | 0 | 1 | 0 | 1 |
| 1 | 0 | 0 | 1 | 1 | 0 |
| 1 | 0 | 1 | 0 | 1 | 0 |
| 1 | 0 | 1 | 0 | 1 | 0 |
| 1 | 0 | 1 | 0 | 1 | 0 |
| 1 | 0 | 1 | 0 | 1 | 0 |
| 0 | 1 | 1 | 1 | 0 | 0 |
| 0 | 1 | 1 | 1 | 0 | 0 |
| 0 | 1 | 1 | 0 | 1 | 0 |
| 1 | 0 | 1 | 0 | 1 | 0 |
| 1 | 0 | 0 | 1 | 1 | 0 |

FIG. 3

DISPLAY DEVICE BEHIND VENEER PANEL AND METHODS FOR OPERATING SAME

CROSS REFERENCE TO RELATED APPLICATIONS

This application claims the benefit of U.S. Provisional Patent Application No. 63/495,570, filed Apr. 12, 2023, which is hereby incorporated by reference for all purposes as if fully set forth herein.

BACKGROUND

The integration of computing devices with everyday items has become increasingly common. Mobile computing devices such as smartphones and electronic tablets are ubiquitous, and computing devices are commonly integrated into kitchen appliances, vehicles, and even furniture. To facilitate user interaction with the computing devices, the appliances, vehicles, or other items into which the computing devices are integrated must have a user interface such as a display. The display is typically visible on the surface of the item, even when the computing device is turned off. This can detract from aesthetics of the item.

To address this, some systems provide shutters or doors over the display. However, shutters and doors can be inconvenient to use, and they add bulk to the display surface. Other systems may add translucent panels over the display, but such panels can interfere with image quality, and in some cases the panels may obscure content that is displayed on the screen.

Accordingly, improved displays for computing devices, as well as methods or systems for integrating displays with other items, are desirable.

SUMMARY

In various embodiments, this disclosure describes a method for providing a visual display behind a veneer. In the method, a processor receives a pixel map of a pattern such as a woodgrain pattern, in which the pixel map includes at least one first area classified as suitable for image presentation and at least one second area classified as unsuitable for image presentation. When the processor receives a command to display an image comprising a plurality of features, the processor will process the image to align: (a) a first set of the features to regions of a display device that correspond to the first areas in the pixel map; and (b) a second set of the features to regions of the display device that correspond to the second areas in the pixel map. The processor will then cause the display device to display the processed image while a veneer that exhibits the pattern is positioned over the display device.

Optionally, the first set of features may comprise text, numbers, and/or icons, and the second set of features may comprise background or blank space.

Optionally, processing the image to align the first and second sets of features to the regions of the display device can comprise not aligning any of the first set of features to regions of the display device that correspond to the second areas in the pixel map.

Optionally, when causing the display device to display the processed image, the method may include causing: (a) light to be emitted at a lower intensity level in regions of the display device that correspond to lighter areas in the veneer registered in the pixel map; and (b) light to be emitted at a second higher intensity level in regions of the display that correspond to areas in the veneer that are darker as represented in the pixel map.

Optionally, the method can also include processing the pixel map to identify the at least one first class area and the at least one second class area by: (a) segmenting the pixel map into clusters; (b) processing each cluster to determine an average color value for the pixels in the cluster; and (c) classifying as a second class area any cluster having an average pixel value that is below a threshold.

Optionally, the method can also include processing the pixel map to identify the at least one first class area and the at least one second class area by: (a) segmenting the pixel map into clusters; (b) using an edge detection algorithm to detect edges of the woodgrain patterns in each cluster; and (c) classifying as a second class area any cluster having a woodgrain pattern with edges that are not substantially parallel to each other.

Optionally, the method can also include receiving an image of the pattern and processing the image to create the pixel map of the pattern. Processing the image to create the pixel map can include identifying grayscale values of each pixel in the image and saving the grayscale values to the pixel map.

In various embodiments, a system includes: (a) a display device; (b) a veneer panel positioned over the display device, wherein the veneer panel exhibits a pattern comprising relatively light areas and relatively dark areas; (c) a processor; and (d) a memory containing programming instructions that are configured to cause the processor to, when executed, display an image on the display device by any of the method variations described above.

BRIEF DESCRIPTION OF THE DRAWINGS

FIG. 3 illustrates example elements of a pixel map.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to."

In this document, when terms such as "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", "above" and "below", "over" or "under", or "front" and "behind," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure will be defined at the end of this Detailed Description section.

Figure 1A:
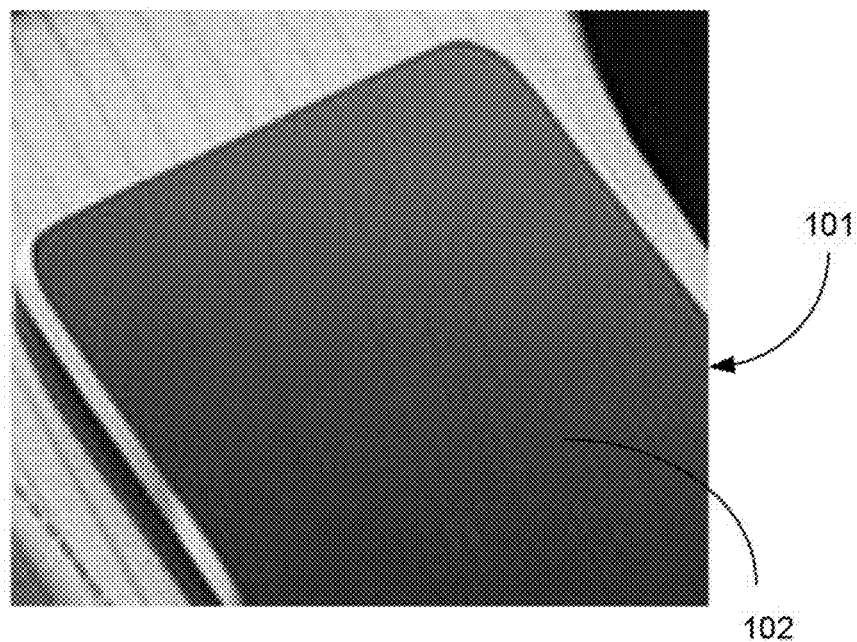
FIG. 1A and FIG. 1B illustrate an example of an electronic display device with a veneer covering.
Figure 1B:

FIGS. 1A and 1B illustrate an example of a display device 101 in accordance with various aspects of this disclosure. The display device 101 shown is that of a smart phone, but in various applications of this disclosure it could be a display that is a portion of any computing device such as a laptop computer, a tablet computing device, or simply a user interface that is integrated into another item such as a vehicle interior panel or other component, appliance, item of furniture, or other item. The display device 101 is covered by a veneer panel 102, which in this case is a wood veneer that exhibits a natural woodgrain pattern. The veneer panel 102 may be made of actual wood, a cellulosic material such as paper or cardboard, or a simulated woodgrain formed of a coating such as paint or polymer. In other embodiments, the veneer panel can be made of a thin layer of another material, such as stone, mother of pearl or another naturally occurring shell, or other materials that exist in nature. In addition, the pattern can be a woodgrain pattern as shown, but in other embodiments the pattern can exhibit a different appearance, such as that of marble, stone, mother of pearl or another shell, another pattern in nature, or another visible regularity of structure or shape in which some areas of the panel exhibit a relatively darker sharing than other areas of the panel that exhibit a relatively lighter shading.

In FIG. 1A the display device 101 is turned off, so the display device is not visible through the veneer panel 102. However, in FIG. 1B, the display device is turned on, and the illumination generated by the display device cases information 103 such as text, numbers, and icons that the display outputs are visible through the veneer panel 102.

Figure 2:
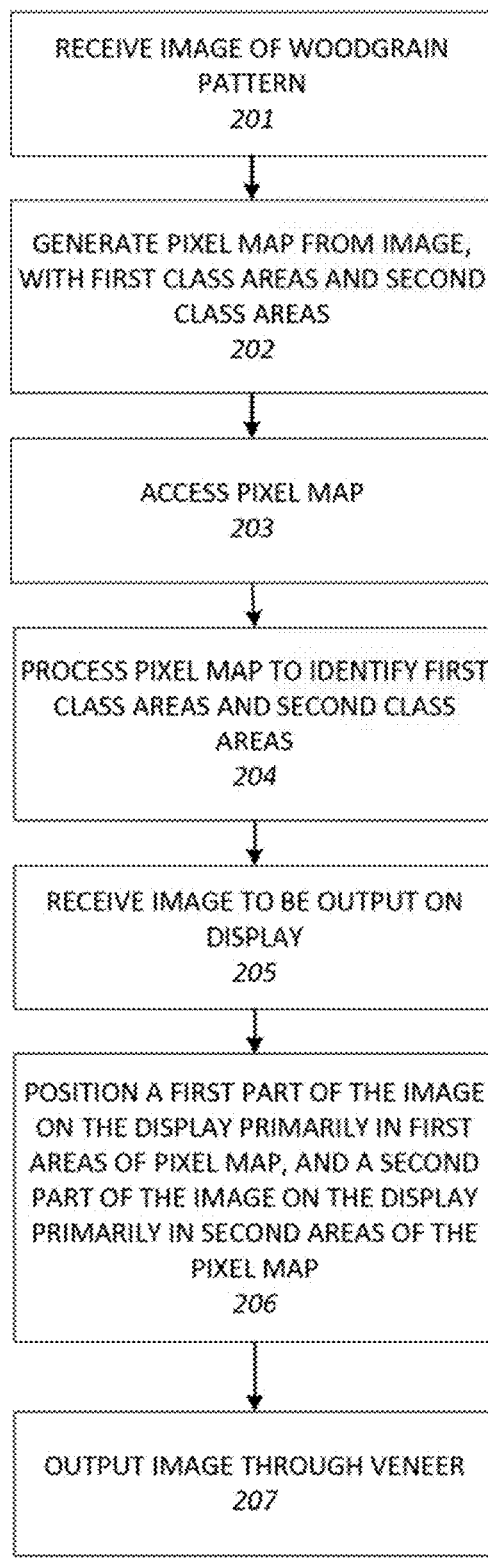
FIG. 2 is a diagram of a method of generating an image and causing a display device to display the image so that it is visible through a veneer covering.

FIG. 2 is a process flow diagram illustrating a method by which a processor and display device generate and output information (such as information 103 of FIG. 1B) so that the information is visible to a user through a veneer that covers the display device. If the processor has access to a pixel map of the veneer, then the method will start at step 203, in which the processor accesses the pixel map of the veneer, and in particular a pixel map of the pattern that appears on the veneer. The pattern can have relatively light areas and relatively dark areas, such as that of the woodgrain pattern shown in FIGS. 1A and 1B.

The pixel map can be a data set that maps features of the pattern to pixels (or groups of pixels) of the display. Each pixel of the pixel map can include data indicating whether or not (or to what extent) the pixel will be covered by a relatively dark area of the pattern. FIG. 3 illustrates an example pixel map 301 in which each pixel data is assigned a color value of 1 if representing a dark area of the pattern, and a color value of 0 if representing a light area of the pattern. This binary example is provided for purpose of illustration; in practice, pixels data can have values that are between zero and 1 if they are partially covered by a light area and partially covered by a dark area. Alternatively, the pixel data can be assigned a value that indicates whether a majority of the pixel is light or dark. Also, the pixel data map might not use binary determinations but can include a range of values, such as 0 to 8, or 0 to 255. If color values are considered, the pixel data values can include three subcomponents, including a red value, a green value, and a blue value (RGB values).

Returning to FIG. 2, at 204 the system can process the pixel map to identify and classify one or more first areas that are suitable for image presentation, and at least one or more second areas that are not suitable for image presentation. The system can use any suitable algorithm to classify the first areas and the second areas. For example, the system can segment the pixel map into multiple clusters of adjacent pixels. For each cluster, the system can then calculate the average of the pixel values in the cluster. The system can qualify a cluster to be classified as a first class area (i.e., preferred, and/or suitable for image presentation) if the average of the pixel values in that cluster is below a threshold, because that would indicate that the cluster generally exhibits a relatively lighter color and will be expected to pass images with minimal degradation. The system can classify a cluster as a second class area (not preferred, or unsuitable for image presentation) if the average of the pixel data values in that cluster is above a threshold, indicating that the cluster is generally dark and would not likely provide content without visible degradation. Step 204 can be performed by the processor after generating or receiving the pixel map, or by another device before the pixel map is sent to the processor. If another device processes the pixel map at step 204, then the classifications can be sent to the processor with, or as part of, the pixel map.

Alternatively, or in addition, the system also can consider the variability of the pattern in each cluster, and in particular whether the edges of the dark areas in the pattern are relatively parallel or whether the edges exhibit scattered patterns. Edges that are relatively parallel to each other are unlikely to detract from image visibility as much as edges that are scattered, so clusters with largely scattered edge patterns can be assigned to the second class (i.e., not preferred, or unsuitable for image presentation). To identify the edges, the system can process the image using any suitable edge detection algorithm, such as the Canny edge detection algorithm.

Figure 4:
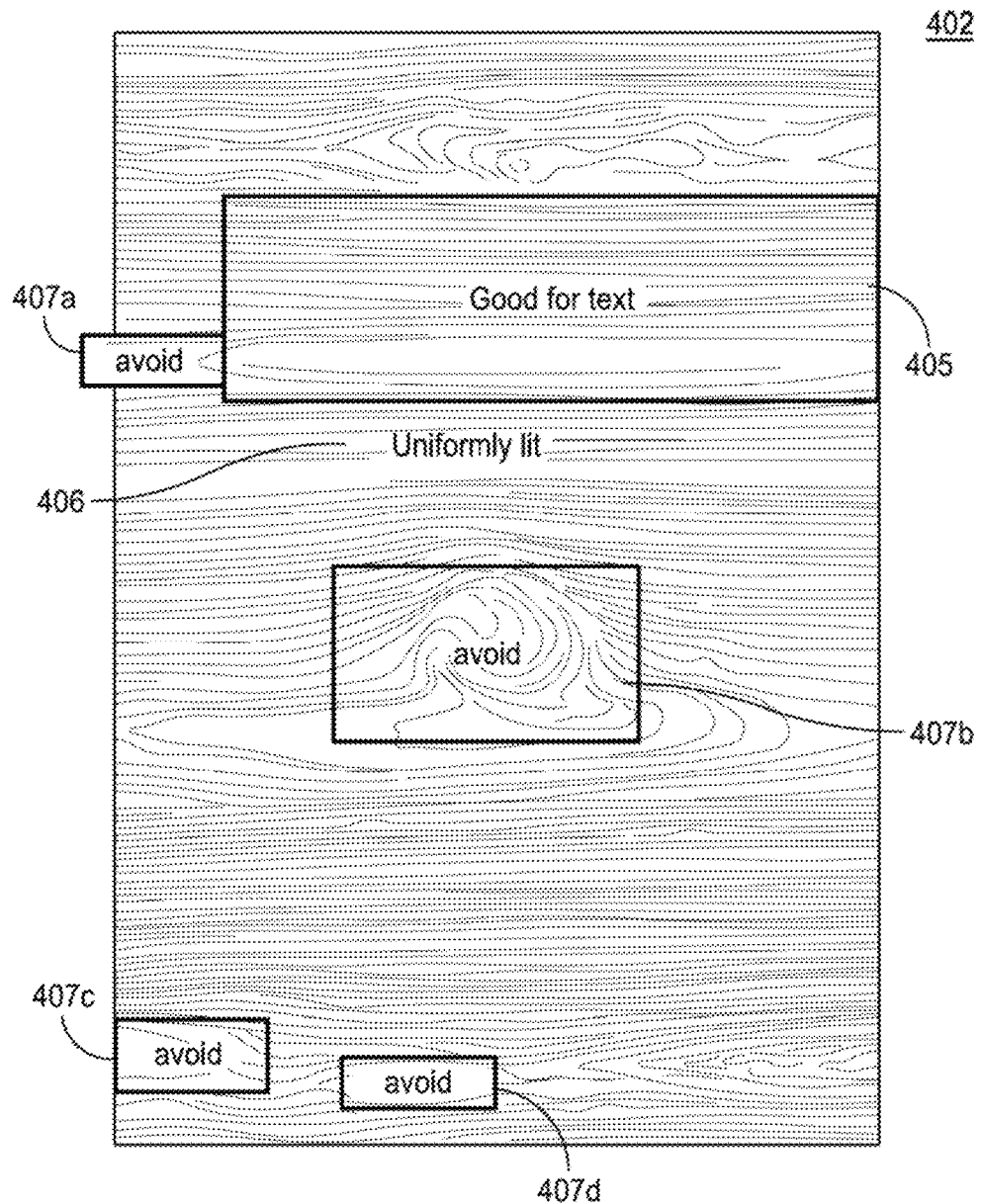
FIG. 4 illustrates an example classification of regions of a pixel map based on positions and characteristics of a woodgrain pattern from which the pixel map was derived.

In some embodiments, the system can consider more than two classes, with varying degrees of preference assigned to each class. An example area classification result is shown in FIG. 4, in which the woodgrain pattern 402 of the veneer includes a first class area 405 that is relatively light and in which the edges are substantially aligned in parallel with each other. The woodgrain pattern 402 also includes several second class areas 407a-407d that are relatively dark and/or exhibit edges having a not substantially parallel pattern. The woodgrain pattern 402 also includes intermediate areas 406 that the system may not consider to be as preferred as the first class area 405, but which are still suitable for displaying information.

Returning to FIG. 2, at 205 the processor can receive an image to output on the display. The processor can render the image, such as that of a user interface 103 shown in FIG. 1B, or the processor can receive the image from an external source. At 206 the processor can align the image to the pixel map so that (i) a first set of the features are aligned to one or more regions of the display device that correspond to the first areas in the pixel map, and (ii) a second set of the features are aligned to one or more regions of the display device that correspond to the second areas in the pixel map.

By way of example, the first set of features can include text, numbers, and/or icons, and the second set of features can comprise background or blank space. If so, then the processor can align the first set of features (text, numbers, and/or icons) to at least one first class area (such as area 405 of FIG. 4) and optionally to one or more intermediate areas that are suitable for image presentation (such as area 406 of FIG. 4). The system can then align only background or blank space to the second class areas (such as areas 407a-407d of FIG. 4). The system can also align some second features (background or blank space) to the first class or intermediate areas, but it might not align any first features to the second class areas.

At 207 the processor can then cause the display device to output the image through the veneer panel. With the alignment as described above, the first set of features in the image are visible through the veneer as shown in in FIG. 1B. Alternatively, or in addition, the processor also can trigger operation of the display device to emit light at a first (relatively higher) intensity level in regions of the display device that correspond to darker areas in the pixel map (such as those where the veneer is darker) and to emit light at a second (relatively lower) intensity level in regions of the display device that correspond to lighter areas in the pixel map. This in an effort to make the brightness appear uniform after light goes through the veneer. If so, the system can position some of the first features (i.e., characters or icons) in the second class areas, since the higher light intensity can help make those areas more visible. In addition, the system can trigger light in intermediate areas (such as area 406) to emit at an intensity that is lower than that of the second class areas 407a-407d but higher than that of the first class areas 405.

As noted above, the method of FIG. 2 can start at step 203 if the processor has access to a pixel map of the pattern that appears on the veneer panel. However, if the processor does not have access to the pixel map, it can generate one. To do this, at 201 the processor can receive an image of the pattern. The processor can receive the image as a digital image file, or it can cause a camera to capture the digital image file of the pattern. At 202 the system can process the image to create the pixel map of the pattern. The system can do this by identifying the color value of each pixel in the image value and saving the color values to a data set, such as that shown in FIG. 3. The color values can be a range of various colors (such as 0 to 255 as is generally know), greyscale values (such as 0 to 8, 0 to 255, or the average of the three red-green-blue color values of a pixel), or binary values (such as light=0 and dark=1).

Figure 5:
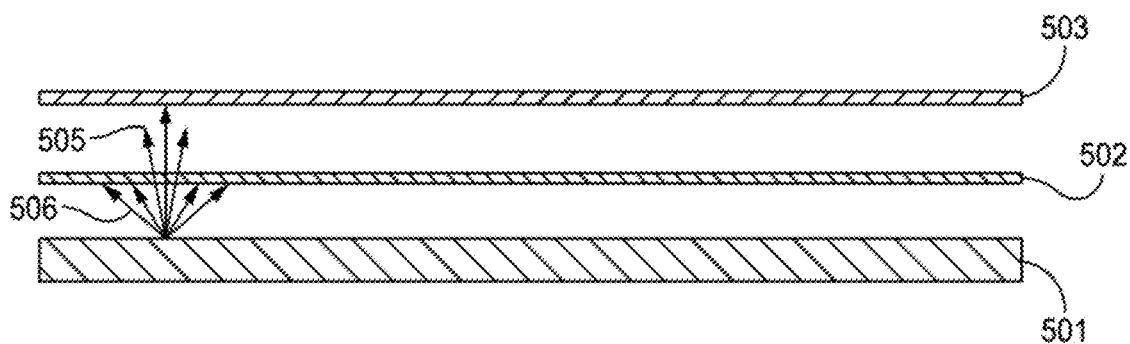
FIG. 5, FIG. 6, and FIG. 7 illustrate examples of systems in which a veneer is positioned over or under a display device without significantly obscuring information output by the display device in various embodiments.
Figure 6:
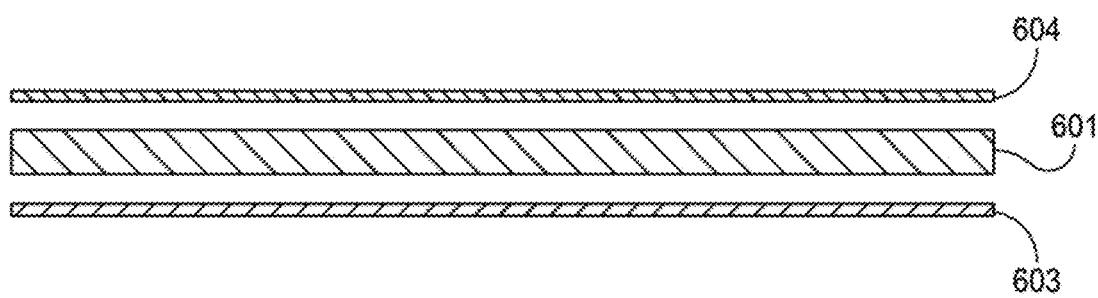
Figure 7:
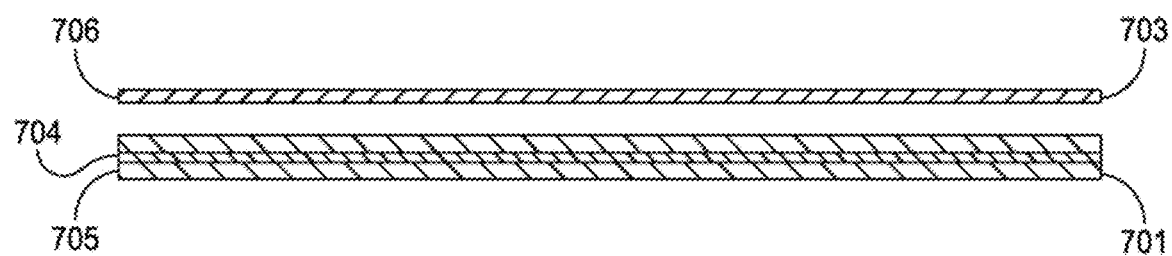

FIGS. 5, 6, and 7 illustrate examples of systems in which a veneer panel is positioned over or under a display device without significantly obscuring information output by the display device in various embodiments.

In FIG. 5, a display device 501, such as a light emitting diode (LED) or liquid crystal display (LCD) display device, emits light and outputs information in a direction that is toward a veneer panel 503. A layer of optical film 502 can be positioned between the display device 501 and the veneer panel 503. The optical film 502 can be of the type that is a thin film linear polarizer (TFPN) or other linear polarizer that filters and blocks light having a polarization state that is different from that of the light that travels in a direction that is substantially parallel to the surface of the display. For example, FIG. 5 shows that light 505 traveling in a direction that is substantially parallel to the surface of the display 501 will pass through the optical film 502, while light that is scattered and not substantially parallel to the surface of the display 501 will be blocked by the optical film 502. In some embodiments, the optical film 502 can comprise a collimating panel such as that described below in the discussion of FIG. 7.

In FIG. 6, a transparent display device 601, such as a transparent organic light emitting diode (OLED) or a transparent organic liquid-crystal display (OLCD) display device, transmits light and outputs information, while the veneer panel 603 is positioned behind the display device 601. Because the display device 601 is transparent, the woodgrain pattern on the veneer panel 603 can be visible through the display device. A layer of protective coating 604 can be positioned in front the display device 601 to help protect the display from damage.

In FIG. 7, a display device 701, such as an LED or LCD display device, emits light and outputs light information in a direction that is toward a veneer panel 703. The display device 701 can include a collimating panel 704 that is positioned over a light-emitting layer 705 of the display and behind one or more other layers 706 of the display device 701, such as between the display's LCD layer and display surface, or between a backlight layer and one or more of the display's electrodes. The collimating panel 704 can be defined from glass, plastic, or any other suitable material and include a matrix of parallel light guides. Each light guide can include an elongated structure, such as a cylinder, that is positioned to pass light in a direction that is parallel to the display's surface (i.e., toward the veneer panel) and block light from scattering in other directions.

In any of the embodiments above, the veneer panel can be formed of a porous or otherwise translucent material and can be very thin. For example, the veneer panel can be made of wood, a cellulosic material such as paper or cardboard, or a simulated woodgrain defined from a coating such as paint or polymer. In other embodiments, the veneer panel can be made of a thin layer of another material such as stone, mother of pearl or another naturally occurring shell, or other materials that exist in nature. In various embodiments, the veneer panel can have a thickness that is in a range that is from a lower end of approximately 0.05 micron, approximately 0.1 micron, or approximately 1 micron to an upper end of approximately 0.5 mm, approximately 1.0 mm, or approximately 2.0 mm. In some embodiments, the thickness can be approximately 0.2 mm. Other thicknesses are possible.

Figure 8:
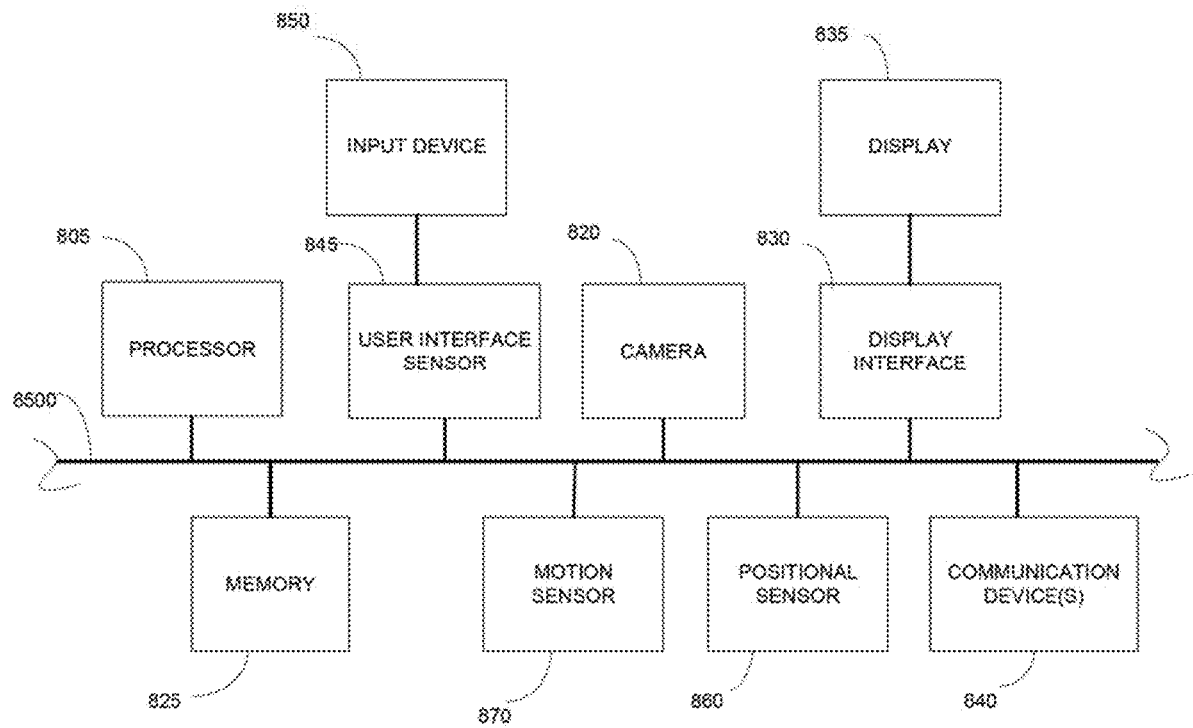
FIG. 8 depicts, in block diagram format, example hardware that a computing device that implements the methods described below can include.

FIG. 8 is a block diagram of an example of hardware that can be included in any of the electronic components of the system, such as the computing device that includes or that is connected to the display that is covered by the veneer. An electrical bus 8500 serves as a communication path via which messages, instructions, data, or other information can be shared among the other illustrated components of the hardware. Processor 805 is a central processing device of the system, configured to perform calculations and logic operations required to execute programming instructions. As used in this document and in the claims, the terms "processor" and "processing device" refers to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory 825. The memory 825 can include a single device or a collection of devices across which data and/or instructions are stored.

A display interface 830 can permit information to be displayed on the display 835 in visual, graphic or alphanumeric format. An audio interface and audio output (such as a speaker) can also be provided. Communication with external devices can occur using various communication devices 840 such as a wireless antenna, a radio frequency identification (RFID) tag and/or short-range or near-field communication transceiver, each of which can optionally communicatively connect with other components of the device via one or more communication systems. The communication device 840 can be configured to be communicatively connected to a communications network, such as the Internet, a local area network, a cellular telephone data network, or the cloud.

The hardware can also include a user interface sensor 845 can provide for receipt of data from input devices 850 such as a keyboard, a mouse, a joystick, a touchscreen, a touch pad, a remote control, a pointing device and/or microphone. Digital image frames can also be received from a camera 820 that can capture video and/or still images. The system can also include a positional sensor 860 and/or motion sensor 870 to detect position and movement of the device. Examples of motion sensors 870 include gyroscopes or accelerometers. Examples of positional sensors 860 include a global positioning system (GPS) sensor device that receives positional data from an external GPS network.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described in this document.

Terminology that is relevant to this disclosure includes:

An "electronic device" or a "computing device" refers to a device or system that includes a processor and memory. Each device can have its own processor and/or memory, or the processor and/or memory can be shared with other devices as in a virtual machine or container arrangement. The memory can contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players, smart speakers and the like. Electronic devices can also include appliances and other devices that can communicate in an Internet-of-things arrangement, such as smart thermostats, appliances, connected light bulbs, and other devices. Electronic devices can also include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server can be an electronic device, and each virtual machine or container can also be considered an electronic device. In the discussion above, a client device, server device, virtual machine or container can be referred to simply as a "device" for brevity. Additional elements that can be included in electronic devices are discussed above in the context of FIG. 8.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the term "imaging device" refers generally to a hardware sensor that is configured to acquire digital images. An imaging device can capture still and/or video images, and optionally can be used for other imagery-related applications. For example, an imaging device can be held by a user such as a DSLR (digital single lens reflex) camera, cell phone camera, or video camera. The imaging device can be a portion of an image capturing system that includes other hardware components. For example, an imaging device can be mounted on an accessory such as a monopod or tripod. The imaging device can also be mounted on a transporting vehicle such as an aerial drone, a robotic vehicle, or on a piloted aircraft such as a plane or helicopter having a transceiver that can send captured digital images to, and receive commands from, other components of the system.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method for providing a visual display behind a veneer, the method comprising, by a processor:
   receiving a pixel map of a pattern that appears on a veneer panel, in which the pixel map includes at least one first area classified as suitable for image presentation and at least one second area classified as unsuitable for image presentation, the at least one first area and the at least one second area are determined based on said pattern that appears on the veneer panel;
   receiving a command to display an image comprising a plurality of features; processing the image to align:
      a first set of the features to regions of a display device that correspond to the first areas in the pixel map, and
      a second set of the features to regions of the display device that correspond to the second areas in the pixel map, and causing the display device to display the processed image while the veneer panel that exhibits the pattern is positioned over the display device.

2. The method of claim 1, wherein:
the first set of features comprise text, numbers, and/or icons; and
the second set of features comprise background or blank space.

3. The method of claim 1, wherein processing the image to align the first and second sets of features to the regions of the display device comprises not aligning any of the first set of features to regions of the display device that correspond to the second areas in the pixel map.

4. The method of claim 1, further comprising, when causing the display device to display the processed image, causing:
light to be emitted at a first intensity level in regions of the display device that correspond to the first areas in the pixel map; and
light to be emitted at a second intensity level in regions of the display device that correspond to the second areas in the pixel map,
wherein the second intensity level is greater than the first intensity level.

5. The method of claim 1, further comprising processing the pixel map to identify the at least one first class area and the at least one second class area by:
segmenting the pixel map into clusters;
processing each cluster to determine an average color value for the pixels in the cluster; and
classifying as a second class area any cluster having an average pixel value that is below a threshold.

6. The method of claim 1, further comprising processing the pixel map to identify the at least one first class area and the at least one second class area by:
segmenting the pixel map into clusters;
using an edge detection algorithm to detect edges of the woodgrain patterns in each cluster; and
classifying as a second class area any cluster having a woodgrain pattern with edges that are not substantially parallel to each other.

7. The method of claim 1, further comprising:
receiving an image of the pattern; and
processing the image to create the pixel map of the pattern.

8. The method of claim 7, wherein processing the image to create the pixel map comprises identifying a grayscale value of each pixel in the image and saving the grayscale value to the pixel map.

9. A system comprising:
a display device;
a veneer panel positioned over the display device, wherein the veneer panel exhibits a pattern comprising relatively light areas and relatively dark areas;
a processor; and
a memory containing programming instructions that are configured to cause the processor to, when executed, display an image on the display device by:
receiving a pixel map of the pattern of the veneer panel, in which the pixel map includes at least one area classified as a first class area and at least one second area classified as a second class area, wherein the first class area and the second class area are determined based on the pattern of the veneer panel;
receiving a command to display an image comprising a plurality of features, processing the image to align:
a first set of the features to regions of a display device that correspond to the first areas in the pixel map, and
a second set of the features to regions of the display device that correspond to the second areas in the pixel map; and
causing the display device to display the processed image while the veneer panel is positioned over the display device.

10. The system of claim 9, wherein the veneer panel has a thickness of from approximately 0.05 micron to approximately 2.0 mm.

11. The system of claim 9, further comprising a layer of polarizing film positioned between the display device and the veneer panel.

12. The system of claim 9, further comprising a collimating panel comprising a plurality of parallel light guides, wherein the collimating panel is positioned between the display device and the veneer panel.

13. The system of claim 9, wherein the veneer panel comprises wood, another cellulosic material, or simulated woodgrain.

14. The system of claim 9, wherein:
the first set of features comprise text, numbers, and/or icons; and
the second set of features comprise background or blank space.

15. The system of claim 9, wherein the instructions to process the image to align the first and second sets of features to the regions of the display device comprise instructions that, when executed, will not align any of the first set of features to regions of the display device that correspond to the second areas in the pixel map.

16. The system of claim 9, further comprising instructions that are configured to cause the processor to, when causing the display device to display the processed image:
cause light to be emitted at a first intensity level in regions of the display device that correspond to the first areas in the pixel map; and
cause light to be emitted at a second intensity level in regions of the display device that correspond to the second areas in the pixel map,
wherein the second intensity level is greater than the first intensity level.

17. The system of claim 9, further comprising instructions that are configured to cause the processor to process the pixel map to identify the at least one first class area and the at least one second class area by:
segmenting the pixel map into clusters;
processing each cluster to determine an average color value for the pixels in the cluster; and
classifying as a second class area any cluster having an average pixel value that is below a threshold.

18. The system of claim 9, further comprising instructions that are configured to cause the processor to process the pixel map to identify the at least one first class area and the at least one second class area by:
segmenting the pixel map into clusters;
using an edge detection algorithm to detect edges of the woodgrain patterns in each cluster; and
classifying as a second class area any cluster having a woodgrain pattern with edges that are not substantially parallel to each other.

19. The system of claim 9, further comprising instructions that are configured to cause the processor to, after receiving an image of the pattern:
process the image to create the pixel map of the pattern.

20. The system of claim 19, wherein the instructions to process the image to create the pixel map comprise instructions to:
identify grayscale values of each pixel in the image; and
save the grayscale values to the pixel map.

\* \* \* \* \*